United States Patent [19]

Zeuner et al.

[11] 4,046,399

[45] Sept. 6, 1977

[54] ELECTROHYDRAULIC SYSTEM FOR TOWED VEHICLE

[75] Inventors: Kenneth W. Zeuner, Newtown; Alonzo B. Jarman, Wrightstown, both of Pa.

[73] Assignee: Control Concepts, Inc., Newtown, Pa.

[21] Appl. No.: 628,967

[22] Filed: Nov. 5, 1975

[51] Int. Cl.² .............................................. B60D 1/08
[52] U.S. Cl. ...................... 280/420; 60/468; 60/DIG. 2; 56/15.6; 172/316; 251/129
[58] Field of Search ........................ 280/420, 421, 422; 214/131 A; 56/15.6; 172/315, 316; 60/468, 494, DIG. 2; 251/129, 290; 137/269

[56] References Cited

U.S. PATENT DOCUMENTS

| 2,425,496 | 8/1947 | Tyler | 60/468 X |
|---|---|---|---|
| 3,143,131 | 8/1964 | Spencer | 137/269 |
| 3,302,317 | 2/1967 | Domres | 172/316 X |
| 3,429,552 | 2/1969 | Huley et al. | 251/129 |
| 3,631,762 | 1/1972 | Fuzzell | 60/DIG. 2 |
| 3,633,869 | 1/1972 | Lehmann | 251/129 |
| 3,703,931 | 11/1972 | Page et al. | 172/4.5 |
| 3,765,644 | 10/1973 | Zeuner | 251/129 |

OTHER PUBLICATIONS

Triggs Hydraulic Loader, Triggs Manufacturing Co., Belmond, Iowa, Nov. 1, 1967.

Primary Examiner—L. J. Paperner
Attorney, Agent, or Firm—Frailey & Ratner

[57] ABSTRACT

A tractor towed vehicle having a frame and hydraulic functions powered by a plurality of hydraulic devices. An electrohydraulic valve assembly is coupled to the devices and is rigidly secured to the frame of the towed vehicle. A switching assembly having a plurality of switches is adapted for electrically switching the valve assembly with a cable coupled between the switching assembly and the valve assembly. The switching assembly is disposed within the tractor cab for easy access of the plurality of switches to the operator of the tractor.

14 Claims, 6 Drawing Figures

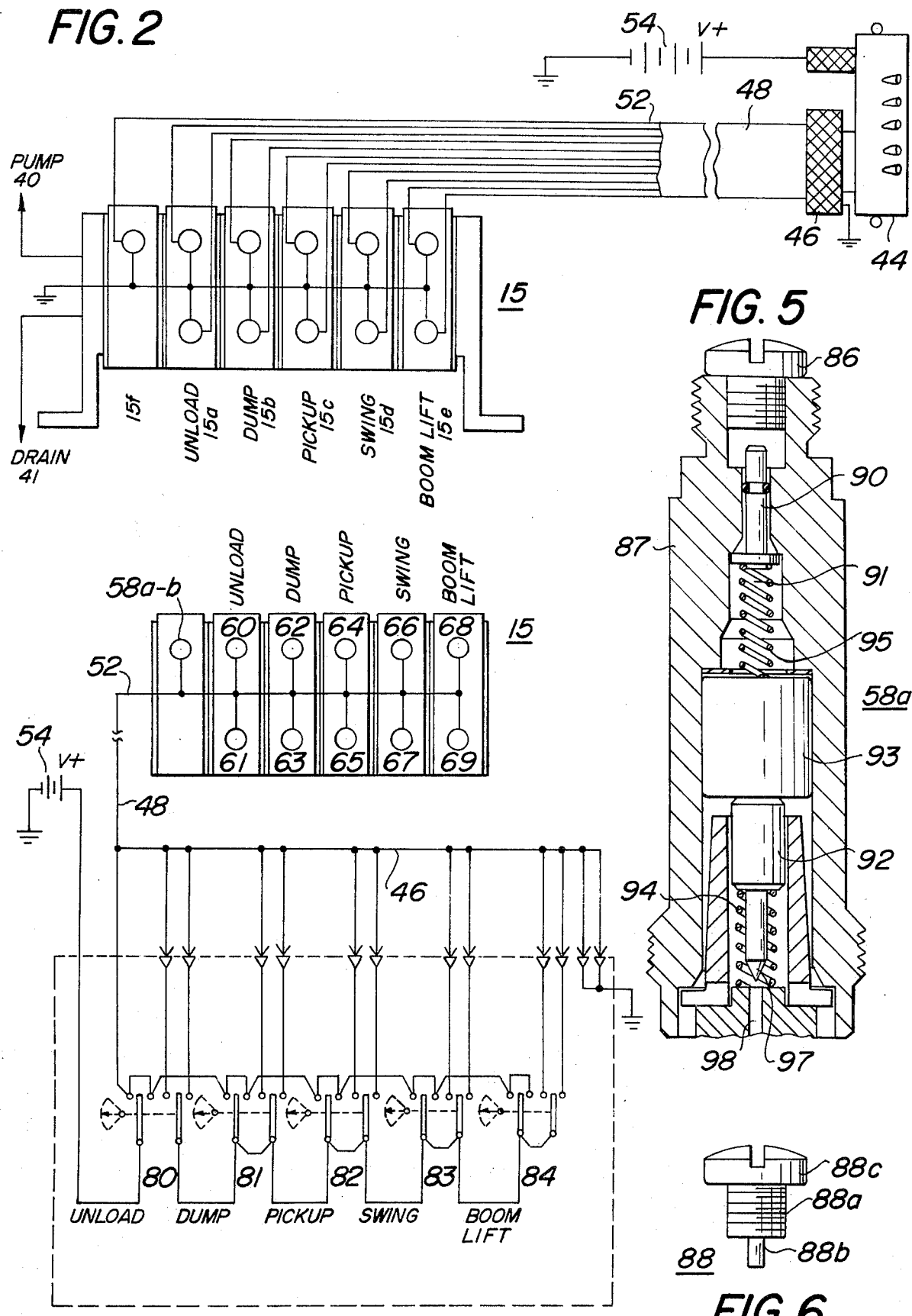

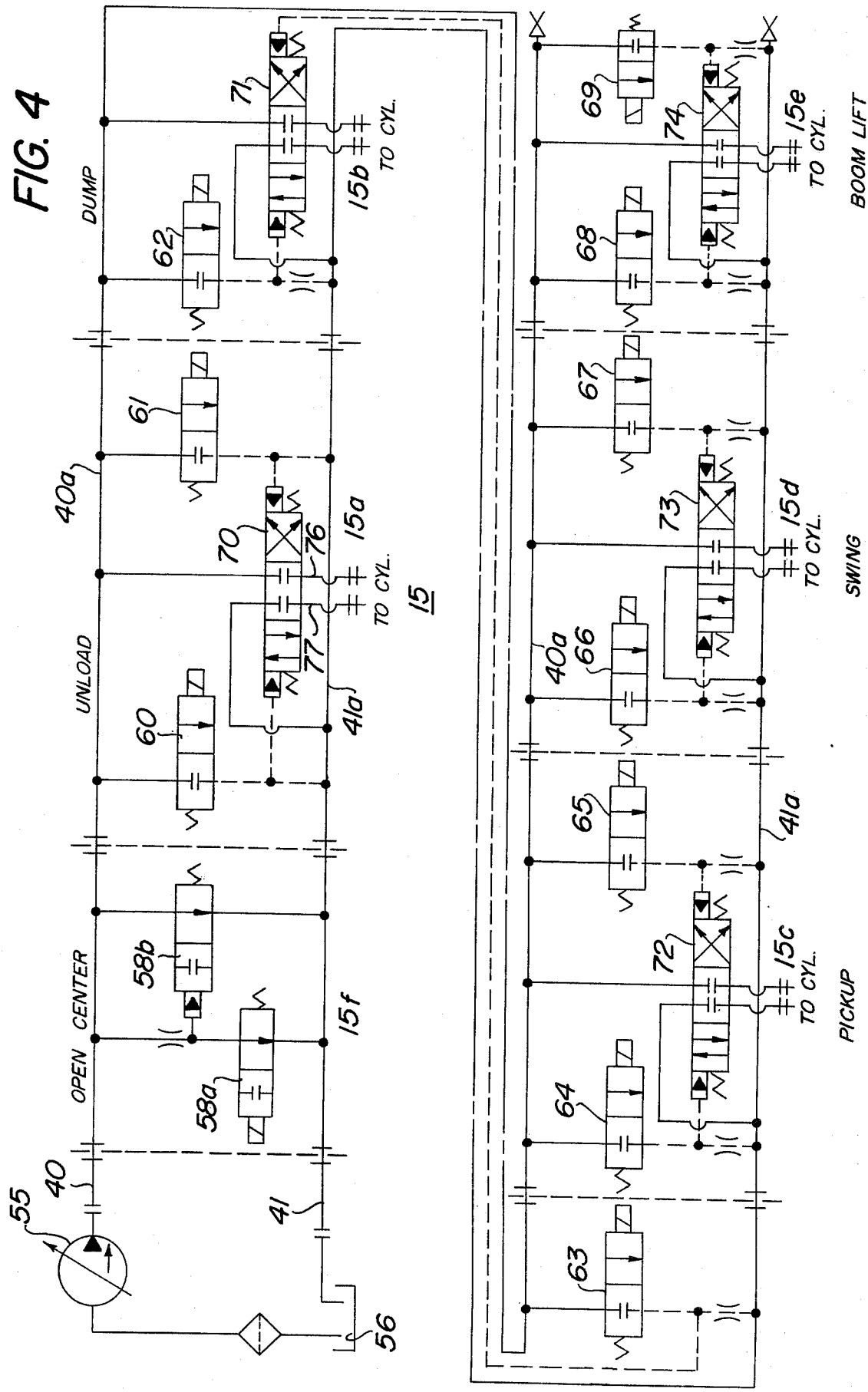

ELECTROHYDRAULIC SYSTEM FOR TOWED VEHICLE

BACKGROUND OF THE INVENTION

A. Field of the Invention

This invention relates to the field of towed vehicles which have many hydraulically operated functions and in particular, an electrohydraulic system for those hydraulic functions.

B. Prior Art

Towed vehicles are well known in the art in which specific functions are carried out hydraulically. In particular, towed farm vehicles may have from three to eight and even more functions each of which is hydraulically powered. For example, the "Stackeze" made by the Haybuster Corporation handles hay and has five functions and thus requires a control valve assembly with five hydraulic control valves and five control handles. Another towed farm vehicle, the "Mark 660 Potato Harvester" made by the Lockwood Corporation may have up to eight functions thus requiring at least one control valve assembly comprised of eight hydraulic control valves and eight control handles.

In such towed vehicles, the control valve assembly may be secured to the towed vehicle. Thus, an operator additional to the tractor operator is required to ride on the towed vehicle in order to actuate the control handles. On the other hand, the control valve assembly may be unbolted from the towed vehicle and attached to the tractor so that the control handles may be close to the tractor operator. Thus, it has been attempted to position the control valve assembly convenient to the tractor operator so that he could not only drive the tractor but also operate the controls of the valve assembly.

However, such "attachable" control valve assemblies have left much to be desired since each valve assembly requires many hydraulic lines between valve assembly and towed vehicle. Accordingly, with two hydraulic lines required for each function, the resultant valve assembly has been unwieldy as well as being a source of noise and dangerous hot oil close to the driver. In addition, the control handles have not really been convenient for manipulation from the driver's seat of the tractor. This is a particularly important problem since many farm tractors now have fully enclosed cabs to protect the operator from noise, dirt, heat, cold, etc. As a result, it has been extremely difficult for the operator to reach around out of the door of an enclosed cab in an attempt to operate the control handles. In some cases, the operator has had to open a window of the cab or make special large openings in the cab for this purpose. However, all of this defeats the purpose of an enclosed cab to provide the operator with a controlled and protected environment.

In an attempt to overcome these difficulties, it has been known to install the control valve assembly inside the cab. However, this is very undesirable. Such an installation requires that all the hydraulic hoses be brought into the cab. This almost completely defeats the controlled environment of the cab by bringing in heat from hoses carrying hot oil and hydraulic noise from the hydraulic system. Thus, there is the unacceptable danger to the operator from hot oil leaks which may be in violation of proposed OSHA regulations.

A further problem arises whether the valve assembly is within the cab or secured to the tractor outside the cab. Specifically, when the towed vehicle is released, the valve assembly must be unbolted, removed from the tractor and stowed on the towed vehicle. Thus there has been required a very heavy transfer of a valve assembly and hydraulic lines with the resultant breakage and crimping of the hydraulic lines.

SUMMARY OF THE INVENTION

A towed vehicle having a frame and hydraulic functions powered by a plurality of hydraulic devices to be controlled. An electrohydraulic valve assembly is hydraulically coupled to the hydraulic devices and is rigidly secured to the frame of the towed vehicle. A switching assembly having a plurality of switches is adapted for electrically switching the valve assembly. An electrical cable is coupled between the switching assembly and the valve assembly secured to the vehicle frame. The switching assembly is disposed within the cab to allow easy access of the plurality of switches to the operator of the tractor while avoiding hydraulic oil lines and valves within the cab and at the same time allowing the towed vehicle to be easily disconnected from the tractor.

BRIEF DESCRIPTION OF THE DRAWINGS

FIG. 2 illustrates in more detail the electrohydraulic valve assembly and switching assembly shown in FIG. 1;

FIG. 3 schematically illustrates the individual switches of the switching assembly as coupled to the electrohydraulic valve assembly of FIGS. 1 and 2;

FIG. 4 schematically illustrates the hydraulic circuit of the electrohydraulic valve assembly of FIGS. 1-3; and FIGS. 5 and 6 illustrates in detail a normally open solenoid valve and a closed center screw adaptor shown in FIGS. 1-4.

DETAILED DESCRIPTION

Figure 1:
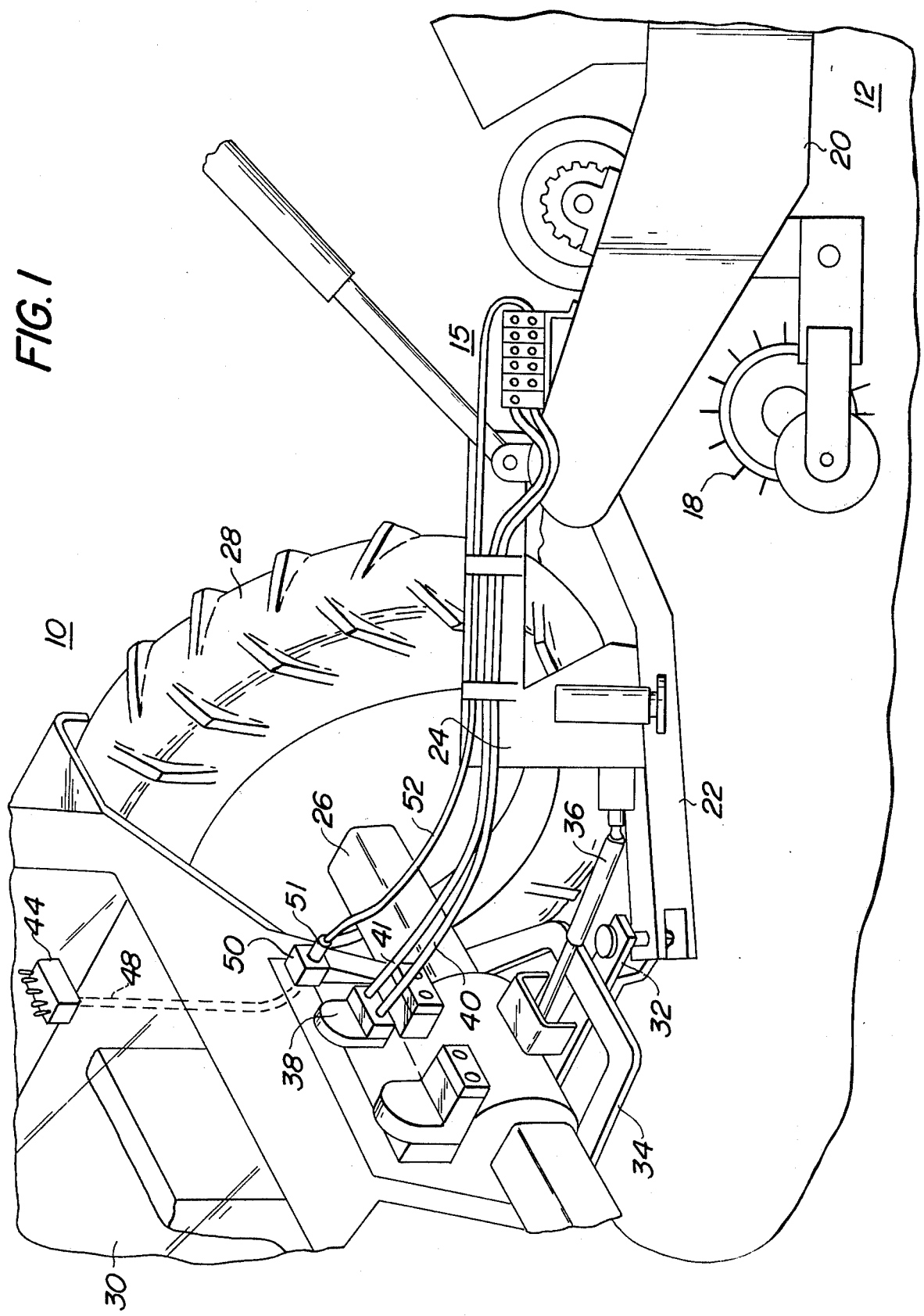
FIG. 1 shows a portion of a towed vehicle and a tractor pulling it.

Referring now to FIG. 1, there is shown a tractor 10 pulling a towed vehicle 12 having an electrohydraulic valve system including a valve assembly 15 which operates and controls all of the hydraulically powered functions of the towed vehicle.

Towed vehicle 12 may be any conventional towed farm vehicle such as "Stackeze 1600" which picks up hay by means of a hay pick up 18, compresses the hay and effectively forms the compressed hay into a stack on the rear portion of vehicle 12 (not shown). Towed vehicle 12 accomplishes its overall stacking operation by means of five hydraulic functions. Thus, valve assembly 15 requires five valve circuits 15a-15d for controlling the five hydraulic functions. As illustrated, vehicle 12 has an elongated frame 20, a hitch bar 22 secured to frame 20 and power apparatus 24 for receiving the power take off (PTO) of tractor 10.

Tractor 10 is a conventional farm tractor having a rear axle 26 and rear wheel 28. Tractor 10 may have a fully enclosed cab 30 or body which provides the tractor operator with protection from noise, dirt, shock, vibration, heat and cold as well as dust, wind and other adverse weather conditions. Thus, the windows, doors and body of cab 30 are tightly sealed and the atmosphere of the cab is pressurized and filtered. It is in this way that dust and powdery snow are kept from the cab's interior. Further, a heater and an air conditioner allow the operator to adjust the cab's temperature and humidity. With the further addition of padding and vibration protection, there is formed a controlled environment for the operator.

Tractor 10 includes a conventional hitch 32 for attachment to hitch bar 22 and a draw bar 34 is helpful with wind-span towed equipment. Further, tractor 10 has a PTO assembly comprising a power shaft 36 which is coupled to assembly 24 of towed vehicle 12. In addition, tractor 10 has a conventional hydraulic remote cylinder outlet 38 coupled to a pump line 40 and a drain line 41.

As shown in FIGS. 1, 2 and 4, pump line or hose 40 and drain line or hose 41 are connected to electrohydraulic valve assembly 15 which is secured to an upper portion of frame 20 as illustrated. Valve assembly 15 is coupled by lines and hoses in conventional manner to the hydraulic cylinders (not shown) of towed vehicle 12 which operate the five functions of unload, dump, pick up, swing and boom lift. It will be understood that these hydraulic functions are examples of hydraulic functions which could be used on a towed vehicle.

Valve assembly 15 is controlled by electric switch assembly 44 which is not secured to the towed vehicle but is mounted within cab 20. For example, assembly 44 may be formed of a rectangular housing bolted within the cab in a position where it would be most comfortable for actuation by the tractor operator. From assembly 44, a connector 46 leads to a cable 48 which extends below the assembly through cab 30 and terminates in a connector assembly 50 at the rear of tractor 10 adjacent outlet 38. A seal is used to plug the gap around cable 48 after it has been installed to maintain the integrity of cab 30. Assembly 50 receives a plug-in connector 51 which is coupled by means of a cable 52 to the valve assembly 15. In this manner, switch assembly 44 is permanently connected within cab 30 and when towed vehicle 12 is to be disconnected from tractor 10, it is only necessary to remove connector 51 and hoses 40, 41 from outlet 38 in order to disconnect the electrohydraulic system between tractor and towed vehicle.

It will now be understood how the integrity and the controlled environment of fully enclosed cab 30 may be maintained while still providing for easy and convenient operation of towed vehicle 12 from within the cab. In this way, there is provided electrically remote actuation of the towed vehicle by means of easily reached electric switches of assembly 44 without the necessity of bringing hydraulic oil and valves within the cab. An electrohydraulic valve system for an attachment converting a farm tractor to a front end loader is described in our copending application Ser. No. 598,726 filed July 24, 1975.

Switch assembly 44 is grounded to the chassis or frame of tractor 10. In addition, the positive side (V+) of tractor battery 54 is coupled to assembly 44 and in conventional manner, the negative side of the battery is coupled to chassis ground. Since towed vehicle 12 may or may not have a ground connection to tractor 10, the ground for valve assembly 15 is returned by way of cables 52 and 48 to the chassis ground at switch assembly 44.

It will be understood that instead of being fixed within cab 30, switch assembly 44 may be releasably secured within the cab in the form of a wall mount with cable 48 being a flexible extension cable extending therefrom. In this way, assembly 44 may be moved anywhere in the cab. Further, cable 48 may itself directly extend to assembly 15 without the use of connectors 50, 51 and pass through a sealed opening in the cab. Accordingly, assembly 44 may then be removed from the cab and used in the cab of another tractor.

Valve assembly 15 operates in the following manner under the control of switch assembly 44 as illustrated in FIGS. 2-4. Valve assembly 15 comprises a stacked valve assembly comprising solenoid valves 60-69 and pilot operated four way spool valves 70-74. As shown, valve assembly 15 comprises six valve sections 15a-f which have been stacked together. Each of the valve sections may comprise one or two solenoid valves and a spool valve. It is in this manner that the unitary valve assembly 5 may be easily mounted on towed vehicle 12 in the manner previously described. It will be understood that such a unitary assembly may be provided by means other than a stacked valve assembly such as a single casting within which all of the valves have been assembled.

As shown in FIG. 4, an hydraulic fluid pump in tractor 10 is indicated as pump 55 while the drain is indicated as reservoir 56. Accordingly, pump and drain lines 40, 41 from pump 55 and reservoir 56 are applied to assembly 15.

Lines 40, 41 lead to valve section 15f which comprises a two stage valve 58a-b which operates as illustrated in FIG. 4 if tractor 10 uses an open center system. With such an open center system, valve assembly 15 requires a normally open condition as illustrated. In the event that tractor 10 uses a closed center system, valve 58a-b may be made normally closed and inoperable in the field by means of a screw adapter 88 shown in FIGS. 5, 6 and later described in detail. Valve 58a-b may be similar in operation and construction to a two stage valve shown and described in U.S. Pat. No. 3,799,497.

One terminal of the coil of each of solenoid valves 58a-b and 60-69 is connected to ground and the other terminal of each solenoid valve is selectively connected by way of cables 52 and 48 and switch assembly 44 to source V+ of electrical supply. Upon actuation of one or more of switches 80-84 as shown in FIG. 3, source V+ is applied to selected ones of the solenoid valves for actuation thereof. Switches 80-84 are conventional spring centered double pole double throw switches in which the left switch sections actuates valve 58a while the right switch section actuates the solenoid valves of a respective valve section 15a-e.

Specifically, the left contact of the right section of each of switches 80-84 are respectively coupled to the coils of hydraulic valves 60, 62, 64, 66 and 68. The right contact of the right section of switches 80-84 are respectively connected to valves 61, 63, 65, 67 and 69. Both contacts of the left section of switches 80-84 are connected to valve 58a. Accordingly, when any one or more of switches 80-84 are moved to the left, valve 58a is energized as well as respective hydraulic valves 60, 62, 64, 66 and 68. On the other hand, when any one or more of switches 80-84 are moved to the right, hydraulic valve 58a is also energized as well as respective valves 61, 63, 75, 67 and 69.

In operation, switch 80 may be manually pushed in a direction as illustrated to the left and thus potential V+ is connected to the coils of solenoid valves 58a and 60. With its coil energized, valve 58a closes thereby closing its second stage 58b and in this way pump line 40a is pressurized. Valve 60 acting as a pilot valve, opens thereby pressurizing the left side of spool valve 70 and applying pressure to the left side of the cylinder. The cylinder of valve 70 is normally sprung to the center position with all ports blocked. Thus, with its left side pressurized, the cylinder moves to the right. Accordingly, pressure is supplied to line 76 and tank to lines 77. In this manner, the unload cylinders connected to lines 76 and 77 are actuated for an unload function.

With switch 80 maintained in the left position, pressure continues to be applied to line 76 until the switch is released and returns to its spring center position. Then, the coils of valves 58a and 60 are deenergized and valve 70 returns to its normal position in which all of its ports are blocked thereby maintaining the position of the unload cylinders connected to lines 76, 77.

In order to reverse the unload cylinders, switch 80 is moved to its illustrated right hand position. In the manner previously described, valve 58a–b is energized and moves to its closed position. In addition, solenoid valve 61 is energized and thus the right hand side of spool valve 70 is pressurized moving the cylinder to the left. Accordingly, the lines are reversed from that previously described with lines 77 having pressure applied thereto and tank is applied to line 76. This condition is maintained as long as switch 80 is maintained in the right hand position. At the time switch 80 is released to its spring center position, the unload cylinders are maintained in their position.

The remaining hydraulic circuits of valve sections 15b–e each operate in similar manner under the control of their respective switches 81–84. Since such operation is similar to that described for section 15a, it is not necessary to describe this operation in detail.

Referring now to FIG. 5, there is shown in detail valve 58a which is similar to the single stage normally opened solenoid operated valve shown in U.S. Pat. No. 3,765,644 and similar to the first stage valve shown in U.S. Pat. No. 3,799,497. Accordingly, with a screw 86 threadedly engaged in an upper section of housing or stack 87 a plunger 90 is not actuated and first stage 58a operates as a normally open valve for use with a tractor's open center system.

However, in the event that tractor 10 uses a closed center system, valve 58a–b is made normally closed by means of the closed center screw adapter 88 shown in FIG. 6 which replaces screw 86. Screw adapter 88 comprises a normal screw threaded portion 88a and a reduced diameter extension 88b extending from the end of threaded portion 88a remote from head 88c. Extension 88b is effective to engage and move downwardly adjusting plunger 90 when screw adapter 88 is manually screwed downwardly into the upper section of stack 87. A spring 95 is disposed within cavity 91 and extends between the lower section of plunger 90 and an upper surface of armature 94. Accordingly, as plunger 90 moves downwardly, spring 95 is effective to downwardly bias armature 93. In turn, armature 93 applies downward pressure on a spring biased poppet 92 thus to close poppet plug 97 in orifice 98. Spring 95 is used to transmit the force from plunger 90 to armature 93 in order to avoid damage to plug 97 and orifice 98 in the event that screw adapter 88 is excessively screwed into stack 87.

It is in this way that first stage 58a and thus second stage 58b may be made normally closed and inoperable in the field by means of replacing screw 86 with a screw adapter 88.

It will be understood that further modifications may be made. For example, switch assembly 44 may contain electronic subassemblies for purposes of automated control. Thus, certain functions may be programmed to operate in a desired sequence. When a bail reaches a certain height, another function and then another function may come into effect.

In addition, an additional switch assembly (not shown) may be provided which is coupled by means of suitable connectors and a cable to switch assembly 44. In this manner, the additional switch assembly may be mounted on the left side of cab 30 for example while assembly 44 may be secured to the right side as shown in more detail in our copending application Ser. No. 598,726.

What is claimed is:

1. In a vehicle towed by a tractor having a cab, the towed vehicle having a frame and hydraulic functions powered by a plurality of hydraulic devices to be controlled in which the improvement combination comprises:
    an electrohydraulic valve assembly having solenoid operated valves, said electrohydraulic valve assembly being hydraulically coupled to said plurality of hydraulic devices and rigidly secured to said frame of said towed vehicle,
    a switching assembly comprising a plurality of switching devices adapted for electrically switching said solenoid operated valves thereby to control said plurality of hydraulic devices, said switching assembly disposed within said cab for easy access of said plurality of switching devices to the operator of said tractor,
    electrical cable means coupled between said switching assembly within said cab and said electrohydraulic valve assembly secured to said towed vehicle frame, and
    means directly electrically connecting each of said switching devices to an individual pair of said solenoid valves, said valve assembly including an unload valve normally maintained open and hydraulically coupling the pressure and tank of said tractor whereby upon actuation of each switching device one solenoid valve of the respective pair is energized and said unload valve is switched to the valve closed state.

2. The combination of claim 1 in which said electrical cable means comprises an electrical cable having a plurality of wires connected to selected ones of said plurality of switches.

3. The combination of claim 2 in which there is provided connector means secured to said tractor and coupled to said electrical cable to provide for the disconnection of the electrical cable between said towed vehicle and said tractor.

4. The combination of claim 3 in which said switching assembly comprises a single assembly releasably secured to said cab and said electrical cable means includes a flexible cable within said cab.

5. The combination of claim 4 in which said switching assembly includes additional connector means secured to said switching assembly to provide for the disconnection of said switching assembly from said electrical cable means.

6. The combination of claim 1 in which said electrohydraulic valve assembly has a plurality of nonmodulated valve sections with each valve section comprising a pair of said solenoid operated valves and a spool valve, each pair of solenoid valves being hydraulically coupled to a respective spool valve for pilot operation thereof, each of said spool valves being hydraulically coupled to and for operation of at least one of said hydraulic devices whereby each hydraulic device is operated upon energization of one of its respective pair of solenoid valves.

7. The combination of claim 6 in which there is provided means directly electrically connecting each of said switching devices to an individual pair of said solenoid valves with only one switching device being coupled to an associated pair of solenoid valves for energizing a selected one of a pair of solenoid valves when an associated switching device is actuated thereby to actuate the respective spool valve for operating the associated hydraulic device.

8. The combination of claim 1 in which there is provided means adapted to be coupled to said unload valve for selectively maintaining said unload valve in a valve closed state.

9. The combination of claim 8 in which said electrohydraulic valve assembly comprises a unitary stacked valve assembly formed by a group of valve sections each of which includes at least one valve.

10. The combination of claim 1 in which said unload valve is solenoid operated and there is provided means for additionally directly connecting each of said switching devices to said unload solenoid valve.

11. The combination of claim 10 in which said unload valve includes a first normally open first stage having plug means movable between an open state and a state seating in and closing a first stage orifice, plunger means movable within said first stage valve for selectively maintaining said plug means in said closed state.

12. The combination of claim 11 in which said first valve stage includes a housing having disposed therein an armature for contacting said plug means, a screw adapter threadedly received within said housing for moving said plunger means to engage said armature thereby moving said armature and said plug means to said closed state.

13. In a vehicle towed by a tractor having a cab, the towed vehicle having a frame and hydraulic functions powered by a plurality of hydraulic devices to be controlled in which the improvement combination comprises:

an electrohydraulic valve assembly having solenoid operated valves, said electrohydraulic valve assembly being hydraulically coupled to said plurality of hydraulic devices and rigidly secured to said frame of said towed vehicle, a switching assembly comprising a plurality of switching devices adapted for electrically switching and solenoid operated valves thereby to control said plurality of hydraulic devices, said switching assembly disposed within said cab for easy access of said plurality of switching devices to the operator of said tractor, and electrical cable means coupled between said switching assembly within said cab and said electrohydraulic valve assembly secured to said towed vehicle frame, said electrohydraulic valve assembly has a plurality of non-modulated valve sections with each valve section comprising a pair of said solenoid operated valves and a spool valve, each pair of solenoid valves being hydraulically coupled to a respective spool valve for pilot operation thereof, each of said spool valves being hydraulically coupled to and for operation of at least one of said hydraulic devices whereby each hydraulic device is operated upon energization of one of its respective pair of solenoid valves, means directly electrically connecting each of said switching devices to an individual pair of said solenoid valves with only one switching device being coupled to an associated pair of solenoid valves for energizing a selected one of a pair of solenoid valves when an associated switching device is actuated thereby to actuate the respective spool valve for operating the associated hydraulic device, said electrohydraulic valve assembly includes an additional unload solenoid operated valve maintained normally open for hydraulically coupling the pressure and tank of said tractor, means for directly connecting each of said switching devices to said additional unload solenoid valve for switching said unload valve to the valve closed state upon actuation of any one of said switching devices thereby to close said unload valve simultaneously with the energization of said selected one of said pair of solenoid valves 14. The combination of claim 13 in which said electrohydraulic valve assembly is in the form of a stacked valve assembly with each of the valve sections of the stacked valve assembly comprising a pair of said solenoid operated valves and said spool valve.

* * * * *

UNITED STATES PATENT OFFICE
CERTIFICATE OF CORRECTION

PATENT NO. : 4,046,399
DATED : September 6, 1977
INVENTOR(S) : Kenneth W. Zeuner and Alonzo B. Jarman It is certified that error appears in the above-identified patent and that said Letters Patent are hereby corrected as shown below:

In claim 13, line 13, delete "and" and insert --said--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks